United States Patent [19]

Yada et al.

[11] Patent Number: 5,059,664
[45] Date of Patent: Oct. 22, 1991

[54] PROCESS FOR THE PREPARATION OF WATER ABSORPTIVE RESIN

[75] Inventors: Shuhei Yada; Takeshi Shibano; Kiichi Itoh; Kenji Yoshinaga, all of Yokkaichi, Japan

[73] Assignee: Mitsubishi Petrochemical Company Limited, Tokyo, Japan

[21] Appl. No.: 369,820

[22] Filed: Jun. 22, 1989

[30] Foreign Application Priority Data

Jun. 22, 1988 [JP] Japan .............................. 63-154188
Aug. 15, 1988 [JP] Japan .............................. 63-202995
Aug. 30, 1988 [JP] Japan .............................. 63-215907

[51] Int. Cl.$^5$ .............................................. C08F 2/34
[52] U.S. Cl. ................................... 526/240; 526/67; 526/229; 526/235; 526/913; 526/915; 522/182; 522/184
[58] Field of Search ................ 522/182, 184, 915; 526/70, 240, 317.1, 913, 235, 915, 67, 229

[56] References Cited

U.S. PATENT DOCUMENTS 4,267,103  5/1981  Cohen ........................... 526/930 X
4,351,922  9/1982  Yoshida et al. ................ 526/930 X

FOREIGN PATENT DOCUMENTS 0570459  2/1959  Canada ............................ 526/240
8100714  3/1981  PCT Int'l Appl. .

Primary Examiner—Fred Teskin
Attorney, Agent, or Firm—Oblon, Spivak, McClelland, Maier & Neustadt

[57] ABSTRACT

A process for the preparation of water absorptive resins which comprises supplying a solution containing at least 20% by weight of a water soluble ethylenically unsaturated monomer as a main component to a polymerization vessel accommodating a vapor phase comprising steam or a mixture of steam with at least one gas substantially inert with respect to polymerization, and polymerizing the monomer in the vapor phase under the relative humidity conditions in the vapor phase of 30% or more.

5 Claims, 4 Drawing Sheets

PROCESS FOR THE PREPARATION OF WATER ABSORPTIVE RESIN

BACKGROUND OF THE INVENTION

1. Field of the Art

The present invention relates to a process for the preparation of water absorptive resins obtained by the polymerization of water soluble ethylenically unsaturated monomers, wherein a solution containing a water soluble ethylenically unsaturated monomer as a main component is fed into a vapor phase and polymerized in the vapor phase.

According to one aspect of the present invention, there is provided a process for the preparation of water absorptive resins obtained by the polymerization of water soluble ethylenically unsaturated monomers, wherein a solution containing a water soluble ethylenically unsaturated monomer as a main component is fed into a vapor phase comprising steam or a mixture of steam with at least one gas substantially inert with respect to the polymerization and polymerized in the vapor phase.

According to another aspect of the present invention, there is provided a process for the preparation of water absorptive resins wherein a solution composed mainly of a water soluble ethylenically unsaturated monomer is supplied to a polymerization vessel accommodating the above mentioned vapor phase and polymerized in the vapor phase, the temperature of the inner wall of said polymerization vessel being adjusted to be higher than that of said vapor phase.

In recent years, water absorptive resins have been used as sanitary goods, diapers and disposable dusters in sanitary fields and as water retentive materials and soil improvers in agricultural fields. Besides, they have found use in various fields and applications inclusive of the solidification of sludge, the prevention of dew condensation and the dehydration of oils.

In particular, the water absorptive resins have been increasingly used for sanitary goods such as sanitary napkins and diapers and for building materials, containerized shipments, marine transportation or the like for the purpose of preventing dew condensation, thus making a good deal of contribution to life in society.

BACKGROUND ART

Known as such water absorptive resins obtained by the polymerization of water soluble ethylenically unsaturated monomers are crosslinked acrylate polymers, saponified products of crosslinked acrylate/vinyl acetate copolymers, crosslinked graft copolymers of starch/acrylates, saponified products of graft copolymers of starch/acrylonitriles, crosslinked products of maleic anhydride-grafted polyvinyl alcohol polymers, crosslinked polyethylene oxides and so on. Details of such products are disclosed in, e.g., Japanese Patent Publication Nos. 60-25045 and 53-46199, and Japanese Patent Laid-Open Publication Nos. 57-158210, 57-21405, 58-71907 and 55-84304. Typically, such products are prepared by the following processes.

1): An aqueous solution of an $\alpha,\beta$-unsaturated carboxylic acid or its alkali metal salt is suspended in a petrolic hydrocarbon solvent containing a sucrose fatty acid ester in the presence or absence of a crosslinking agent and then polymerized in the presence of a radical polymerization initiator.

2): An aqueous solution of acrylic acid or its alkali salt is suspended in an alicyclic or aliphatic hydrocarbon solvent containing a surface active agent having an HLB of 8 to 12 and then polymerized in the presence of a water soluble radical polymerization initiator.

3): At least one (A) of starch and cellulose and at least one (B) of monomers having an addition polymerizable double bond which are water soluble or made water soluble by hydrolysis are polymerized as essential components with the optional addition of a crosslinking agent (C) and, if required, followed by hydrolysis.

4): A polymerization initiator is added to a heated aqueous solution containing potassium acrylate and a water-miscible or soluble divinyl compound in a concentration range of 55 to 80% by weight, in which they are polymerized with no application of external heat but vaporization of water content to obtain water swelling polymers.

5): While using as a protective colloid a reaction product obtained by grafting 1 to 20% of an $\alpha,\beta$-unsaturated carboxylic acid or its anhydride on a monoolefinic polymer having a molecular weight of 750 to 10,000 or a product obtained by the oxidation of a monoolefinic polymer to a final acid value of 10 to 100, an aqueous monomer solution is suspended in a liquid which is hydrophobic and inert with respect to polymerization and then polymerized in the presence of a water soluble radical polymerization initiator.

In general, the water absorptive resins are prepared through the synthesis of polymers by reverse-phase suspension polymerization, reverse-phase emulsion polymerization, aqueous solution polymerization, reactions in organic solvents or other processes.

Such conventional polymerization processes have involved various problems due to bulk polymerization or polymerization with monomer solutions in the form of droplets but dispersed in solvents.

For instance, the bulk polymerization has needed a specially designed polymerization vessel due to very increased viscosity of the resulting polymers, or the addition of a specific surfactant so as to reduce a large amount of residues remaining within the vessel. There has also been a need of providing an additional pulverizer to prepare the obtained polymers as powdery products, leading to another need of granulating or repulverizing the resulting finely divided powders, etc. Thus, the bulk polymerization processes have been still unsatisfactory from an economical standpoint of view.

On the other hand, the processes for polymerizing liquid monomers in the form of droplets but dispersed in solvents has the advantages that general-purpose tank type of reactors can be employed and the polymers are obtained in granular form and thus easy to handle. However, such polymerization processes have been again economically unsatisfactory because of additional equipment for separating the resultant polymers from the solvents, recovering and purifying the solvents and other purposes being needed.

In Japanese Patent Publication No. 32-10196, there has been proposed a process for obtaining polymers with a wide range of molecular weight at a high degree of conversion by the spray polymerization of acrylates. However, this process is found to give only water soluble polymers. This is because water is selectively evaporated from the supplied monomer droplets to precipitate the acrylates, resulting in a considerable lowering of the conversion of the monomers and the degree of polymerization, since an extended induction period of persulfates gives rise to a drop of relative humidity due to a temperature rise under conditions involving mere overheating of air and an elevated temperature is applied.

In Japanese Patent Laid-Open Publication No. 49-105889, there has been proposed a process for the spray polymerization of acrylates with the use of a redox initiator. With this process giving water soluble polymers, it is impossible to obtain such self-crosslinked water-insoluble water absorptive resins as attainable in the present invention.

SUMMARY OF THE INVENTION

An object of the present invention is to eliminate the defects of the prior art and provide a process for preparing water absorptive resins obtained by the polymerization of water soluble ethylenically unsaturated monomers in a stable manner.

More specifically, the present invention provides a process for the preparation of water absorptive resins supplying a solution containing at least 20% by weight of a water soluble ethylenically unsaturated monomer as a main component to a polymerization vessel accommodating a vapor phase comprising steam or a mixture of steam with at least one gas substantially inert with respect to polymerization, and polymerizing the monomer in the vapor phase under the relative humidity conditions in said vapor phase of 30% or more.

The present invention further provides a process wherein the above vapor phase polymerization is carried out using such a polymerization vessel that the temperature of the inner wall thereof is adjusted to be higher than that of the vapor phase.

In the preparation of such water absorptive resins obtained by the polymerization of water soluble ethylenically unsaturated monomers with the application of, e.g., bulk polymerization, it has been required to rely upon a specially designed reactor, leave a large amount of residues within the reactor, or granulate or re-pulverize pulverized and finely divided powders, etc. In the preparation of water soluble resins by the polymerization of a monomer solution in the form of droplets but dispersed in solvents, some additional equipments for separating the resulting polymers from the solvents, recovering and purifying the solvents and other purposes have been needed. In view of the above, it is believed that the process of the present invention makes a great contribution to solving the problems of the conventional polymerization processes, since granular polymers are obtained with a reactor of simple structure without any solvent being used.

According to the first aspect of the present invention, the polymerization of water soluble ethylenically unsaturated monomers is carried out in a vapor phase comprising steam alone or in combination with a gas substantially inert with respect to said polymerization, thereby making it possible to polymerize said monomers within a short period of time. According to the second aspect of the present invention, the temperature of the inner wall of a polymerization vessel is made higher than that of the vapor phase accommodated therein, thereby keeping polymer deposits from being accumulated on the inner wall of the polymerization vessel, or making it easy to remove such polymer deposits, if any.

The present invention makes a great deal of contribution to industries, since economical processes are feasible with the achievement of reduced cost and stable quality.

Figure 1:
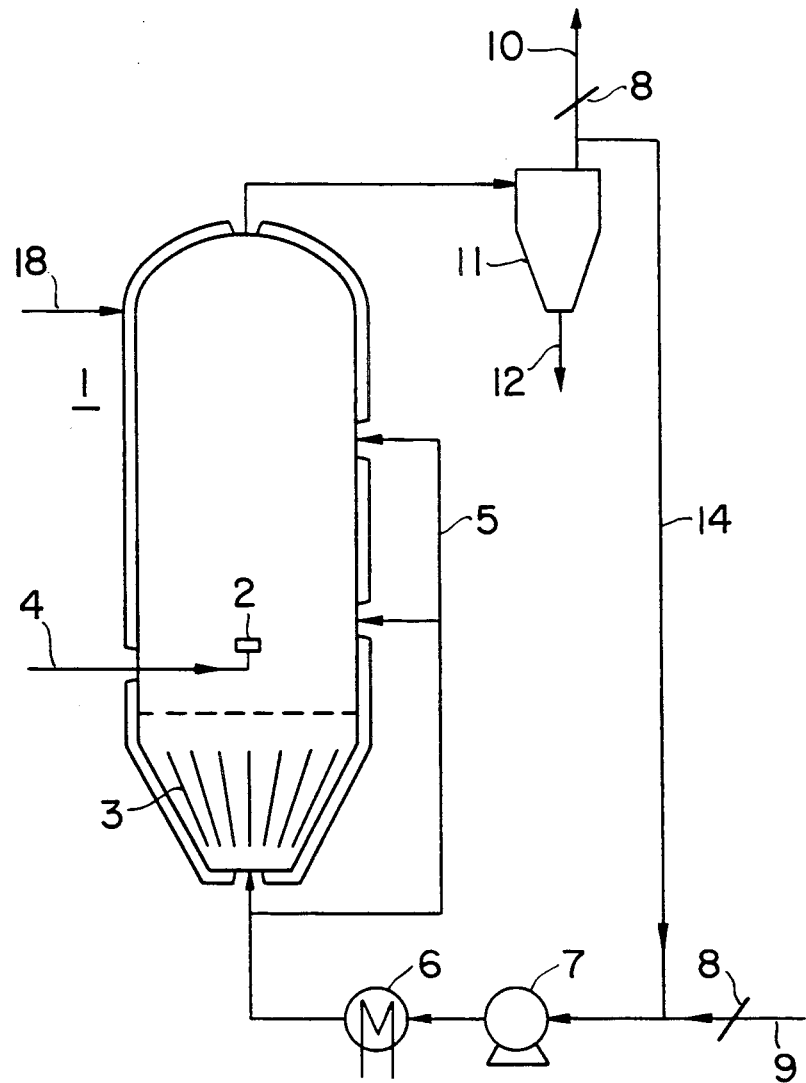
FIGS. 1 and 2 are views illustrative of two embodiments of the polymerization vessel used in the present invention.

Throughout the drawings, reference numeral 1 stands for a polymerization vessel (provided with a steam jacket); 2 a nozzle for supplying a feed monomer; 3 a gas stream distributor; 4 a feed monomer supply line; 5 a gas stream supply line; 6 and 15 gas stream heaters; 7 a gas stream supply blower; 8 a gas stream regulating damper; 9 a gas stream supplementing line; 10 a gas stream discharge line; 11 a solid/gas separator; 12 a solid (polymer) discharge line; 13, an ultraviolet irradiator and/or a high-energy radiator; 14 a gas stream circulating line; 16 a drying section; 17 an air knocker; and 18 a steam supply line.

DETAILED DESCRIPTION OF THE INVENTION

Water Soluble Ethylenically Unsaturated Monomers

The water soluble ethylenically unsaturated monomers used in the present invention may be any monomers which are convertible into highly water absorptive resins and impart satisfactory water absorption capacity thereto after drying and other post-treatments.

The water soluble monomers imparting such capacity to the resins may include water soluble ethylenically unsaturated monomers having functional groups derived from carboxylic acids and/or their salts, phosphoric acids and/or their salts and sulfonic acids and/or their salts. More specifically, use may be made of, e.g., (meth)acrylic acid or its salt, maleic acid or its salt, itaconic acid or its salt, vinylsulfonic acid or its salt, 2-acrylamide-2-methylpropanesulfonic acid or its salt, 2-acryloylethanesulfonic acid or its salt, 2-acryloylpropanesulfonic acid or its salt, 2-methacryloylethanesulfonic acid or its salt and vinylphosphonic acid or its salt, which may be used alone or in combination of two or more. It is understood that the term "(meth)acryl" shall mean both "acryl" and "methacryl". Among others, particular preference is given to acrylic acid or (and) its salt in which at least 20% of its carboxyl groups are neutralized into its alkali metal or ammonium salt by sodium hydroxide, potassium hydroxide, ammonium hydroxide and the like. At a degree of partial neutralization below 20%, there will be a considerable drop of the water absorption capacity of polymers.

In the case of partially neutralized sodium salt of acrylic acid, the salt in which 20% to below 95%, preferably 35% to below 90%, more preferably 40% to below 80% of the carboxyl groups are neutralized may be used. A degree of partial neutralization below 20% is not preferred, since partially neutralized sodium acrylate then decreases in its ability of imparting water absorption capacity to the resulting polymer, although increasing remarkably in its solubility in water. A degree of partial neutralization higher than 95% is again not preferred, because not only is the solubility in water reduced to a very low level, but also any prominent improvement is not introduced into the water absorption capacity of the resulting polymer. In the case of partially neutralized potassium salt of acrylic acid, the salt in which 40% or more, preferably 60% or more of the carboxyl groups are neutralized may be used.

In addition to the above water soluble ethylenically unsaturated monomers, use may be made in the present invention of monomers copolymerizable therewith such as, (meth)acrylamide, 2-hydroxyethyl (meth)acrylamide, (poly)ethylene glycol mono(meth)acrylate and 2-hydroxyethyl (meth)acrylate as well as monomers of low water solubility, for instance, alkyl acrylates such as methyl and ethyl acrylates in an amount which will not impair the capacity of the resulting water absorptive resin.

Further, crosslinking agents and additives may be added to such monomers for the improvement of water absorption capacity. Preferably used as the crosslinking agents are water soluble compounds copolymerizable with the monomers and including at least two functional groups capable of reacting with such functional groups as carboxylic, phosphoric and sulfonic acids such as, for instance, divinyl compounds exemplified by N,N'-methylene-bis(meth)acrylate and (poly)ethylene glycol (meth)acrylate; polyglycidyl ethers exemplified by ethylene glycol glycidyl ether and polyethylene glycol glycidyl ether; polyols exemplified by glycerin and pentaerythritol; and polyamines such as ethylenediamine. Of these compounds, particular preference is given to N,N'-methylene-bis(meth)acrylamide. The amount of the crosslinking agent used is in a range of 0.001 to 1.0% by weight, preferably 0.01 to 0.5% by weight relative to the amount of the monomer(s) charged. When the crosslinking agent is used in an amount exceeding 1.0% by weight, the water absorption capacity of the resulting polymers is very low due to their very high degree of crosslinking. When it is used in an amount less than 0.001% by weight, on the other hand, there is obtained a polymer having a very low degree of crosslinking. Such a polymer has as low a strength upon water absorption that it cannot stand up to practical use or is in the form of a water soluble polymer.

The additives may be exemplified by inert inorganic powders such as finely divided silica, titanium dioxide powders and alumina powders or surface active agents, and may optionally be used in suitable amounts depending upon the desired purposes.

In the present invention, use may also be made of powdery to granular carriers for water absorptive resins, which are either dispersed in an aqueous monomer solution of such components as mentioned above or supplied separately from the aqueous monomer solution. Such carriers may include porous or water absorptive materials such as cellulose powders, chopped fibers and pulverized sponges; inorganic materials such as clay and ceramics; and other materials. Such additives may be used in excess of the water soluble monomer(s) or the water soluble polymer obtainable therefrom. Even in such a case, esp., when the additives are present in the monomer solution, what is supplied to the vapor phase constituting the polymerization system shall be taken as being "a solution containing a water soluble ethylenically unsaturated monomer as a main component".

According to the present invention, a solvent for the "solution containing a water soluble ethylenically unsaturated monomer as a main component" may be water or a mixture of water with various water-soluble or miscible materials. The latter water-soluble or miscible materials may be water soluble organic solvents or inorganic salts and used depending upon the desired purposes. A water soluble polymerization initiator (to be later described in detail) may also be dissolved in this solution.

The concentration of the water soluble ethylenically unsaturated monomer in the aforesaid solution containing a water soluble ethylenically unsaturated monomer, i.e., the feed monomer solution for polymerization is at least 20% by weight, preferably at least 25% by weight. A concentration less than 20% by weight is not preferred, since no satisfactory water absorption capacity is obtained of the water absorptive resins after polymerization. It is noted, however, that the upper limit concentration is about 80% by weight.

It is here understood that the concentration of partially neutralized sodium acrylate in the above aqueous solution is usually in a range of 45 to 80% by weight, preferably 55 to 70% by weight, although varying with the degree of neutralization. A concentration higher than 80% by weight is not preferred, since it is then required to bring the aqueous solution of partially neutralized sodium acrylate to a considerably high temperature or reduce the degree of its neutralization to as small as, e.g., 20% or below. On the other hand, a concentration lower than 45% by weight is unrecommendable, since no appreciable effect upon the improvement of water absorption capacity is found and a longer time and larger energy are required for postdrying treatments due to increase in the concentration of water. In the case of partially neutralized potassium acrylate, a concentration of 45 to 80% by weight, preferably 55 to 80% by weight, is usually adopted.

For the neutralization of acrylic acid into such a sodium salt as mentioned above, use may be made of a hydroxide or bicarbonate of sodium or the like, but particular preference is given to sodium hydroxide.

Polymerization

According to the process of the present invention, the monomer solution is polymerized in a vapor phase. Any desired method and equipment suitable for the intended purposes may be used, provided that such polymerization is achievable and the temperature of the inner wall of a polymerization vessel can optionally made higher than the vapor-phase polymerization temperature.

A polymerization vessel in which a vapor phase defining a polymerization site is contained to carry out the vapor-phase polymerization of the present invention may take any desired form inclusive of tank or tubular form with the proviso that its inner wall's temperature can be maintained at a given or predetermined level.

In order to maintain the inner wall's temperature at a given or predetermined level, the polymerization vessel may be provided with an external circulation system of the vapor phase in which the vapor phase is heated or cooled. Alternatively, the polymerization vessel may be provided with an external jacket through which a suitable heating medium circulates or electrically heating means.

In order to prevent polymer deposits from being formed within the polymerization vessel or make it easy to remove such polymer deposits, it is preferred that no additional equipments is provided therein. However, suitable additional equipments such as baffles and stirrers may be provided in place so as to regulate a flow of the vapor phase in the polymerization vessel.

It is required that the polymerization vessel be provided with at least one inlet for feeding the aqueous monomer solution, etc. thereto and at least one batchwise or continuous inlet for discharging the resulting polymer powder therefrom. The polymer powder may be discharged from the polymerization vessel together with a part of the vapor phase which keeps the powder fluidized.

Figure 2:
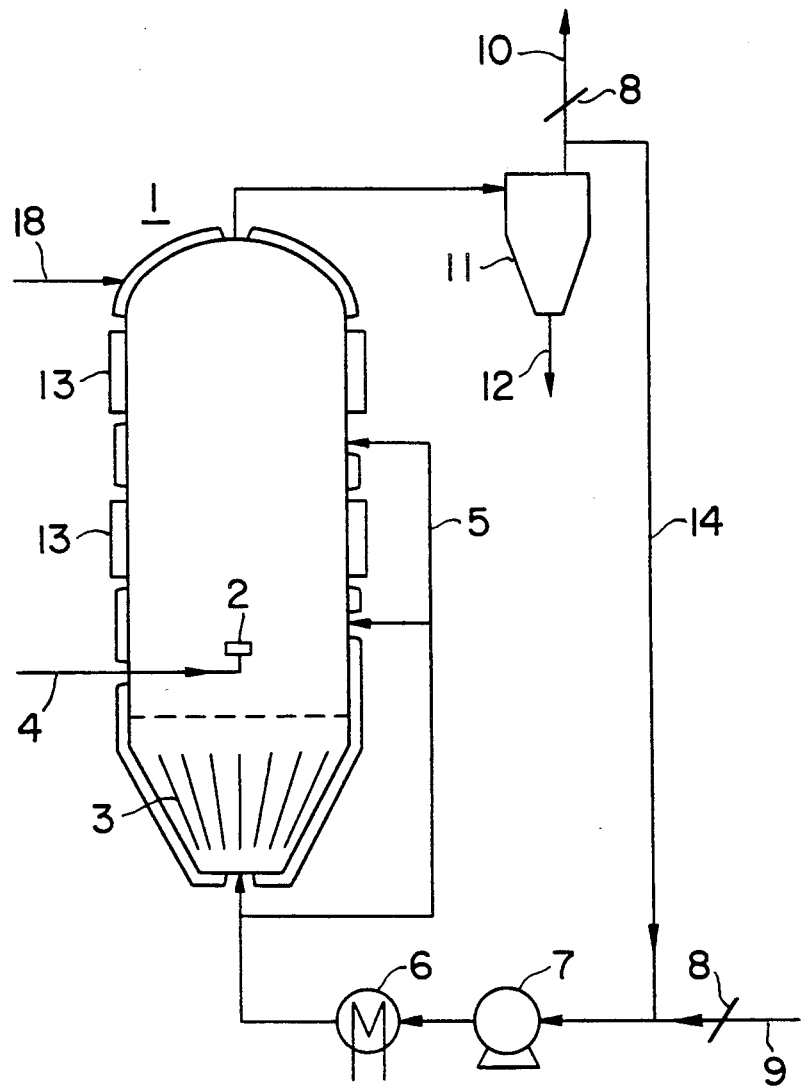
Figure 3:
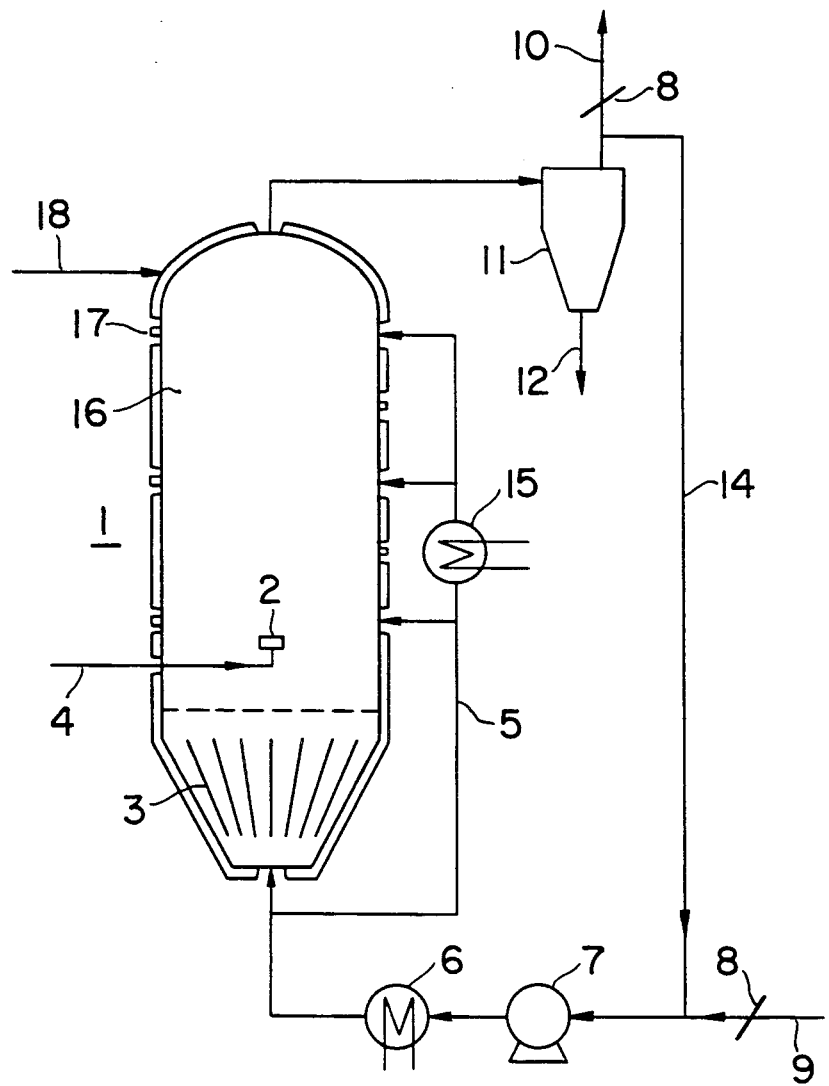
FIG. 3 is a view showing one embodiment of the polymerization vessel of FIG. 1 additionally provided with a drying unit.

FIGS. 1 to 3 show suitable embodiments of the apparatus used in the present invention for the purpose of exclusively illustrating the principles of the present invention. Thus, it is included in the scope of the present invention to provide additional devices without departing from the purport of the present invention.

Referring first to FIG. 1, there is shown one embodiment of the apparatus designed to initiate polymerization with the use of a chemical polymerization initiator. Referring then to FIG. 2, there is shown one embodiment of the apparatus designed to initiate polymerization with the irradiation of ultraviolet rays and/or high-energy radiations which may be used optionally in combination with the chemical polymerization initiator.

FIG. 3 is a view illustrating the apparatus of FIG. 1 which is additionally provided with a drying unit. Obviously, this additional unit may also be provided to the system of FIG. 2.

Figure 4:
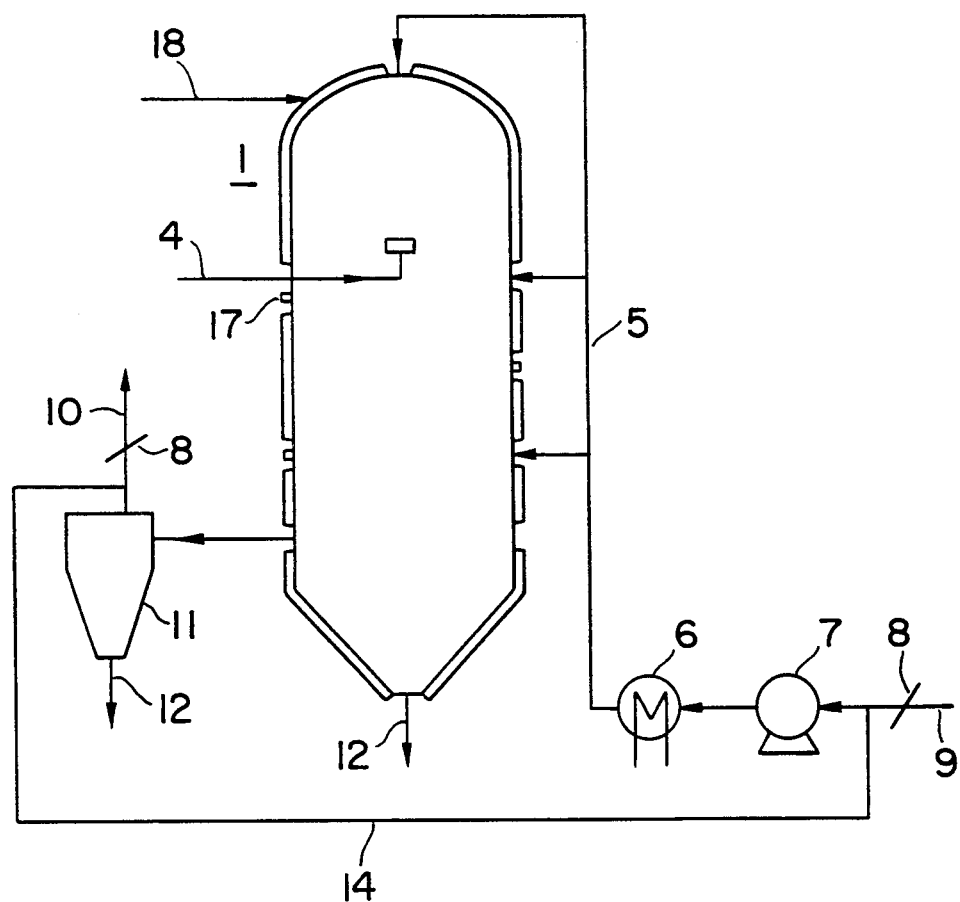
FIG. 4 is a view illustrating one modification of the polymerization vessel of FIG. 1.

Referring finally to FIG. 4, there is shown one modification of the apparatus of FIG. 1, wherein a gas stream is supplied in countercurrent contact with the monomer droplets fed. For the reference numerals given throughout FIGS. 1 to 4, see "BRIEF DESCRIPTION OF THE DRAWINGS".

The solution containing the water soluble ethylenically unsaturated monomer as a main component is supplied through one or more feed inlets into the polymerization vessel while preferably being uniformly dispersed throughout the vapor phase. Although no special limitation is imposed upon how to supply the feed solution, it is preferably fed with an atomizer or a spray in view of uniform dispersion. The feed solution may be supplied in any one of gravitational, countergravitational, horizontal (e.g., centripetal or tangential) and other directions. Preferably, it is supplied in the counter-gravitational direction.

The monomer solution to be supplied may be at ordinary temperature or at a temperature higher or lower than ordinary temperature in view of temperature controlling.

In order to initiate the polymerization of the water soluble ethylenically unsaturated monomer solution after its feeding, it has previously been mixed with a polymerization initiator or is mixed in the polymerization vessel with a polymerization initiator supplied through a feed inlet provided separately from the aqueous monomer solution feed inlet, if required, with the application of heat, etc. Alternatively, the monomer solution may be mixed with a photosensitizer and irradiated with ultraviolet rays after fed to the solution may be irradiated with high-energy radiations after fed to the polymerization vessel.

Thus, according to the present invention the monomers are typically polymerized using a water soluble radical polymerization initiator, ultraviolet rays, high-energy radiations or other means, which may be applied alone or in combination of two or more.

The water soluble radical initiators used in the present invention are well known in the art of polymer chemistry. Specifically enumerated are inorganic or organic peroxides, e.g., persulfates (ammonium salts, alkali metal salts, esp., potassium and other salts), hydrogen peroxide, di-tert-butyl peroxide, acetyl peroxide and the like. In addition to these oxides, azo compounds or other radical polymerization initiators such as 2,2'-azobis(2-amidinopropane)dihydrochloride may be used provided that they exhibit a certain level of water solubility.

The polymerization is initiated by the decomposition of the radical polymerization initiator, which is conventionally effected by heating. It is noted in this connection that since the polymerization initiator has already been often brought up to its decomposition temperature at a time when coming in contact with the monomer, the polymerization of the monomer initiated by mere addition of the initiator thereto in the absence of any external heat is herein also included in the category of the decomposition by heating. Another well known means for promoting the decomposition of the polymerization initiator is to use a chemical substance. If the polymerization initiator is a peroxide, then the substance for accelerating its decomposition is a reducing compound (of water solubility in the present invention). For instance, an acidic sulfite, ascorbic acid, an amine or the like may be used in combination with a persulfate. The polymerization initiators comprising combinations of peroxides with reducing compounds are well-known as "redox initiators" in the art of polymer chemistry. Accordingly, the term "polymerization initiator" is herein understood to include initiators combined with such decomposition accelerating substances, esp., the redox initiators.

The amount of the above water soluble radical polymerization initiators to be used is generally in a range of 0.001 to 10% by weight, preferably in a range of 0.1 to 5% by weight, relative to the water soluble ethylenically unsaturated monomer.

The high-energy radiations used may include electromagnetic radiation, corpuscular ion radiation and so on. For polymerization with the irradiation of ultraviolet rays, a photosensitizer is often used.

Referring to the type of gases forming a vapor phase providing a polymerization site for the polymerization of the water soluble ethylenically unsaturated monomer solution, any gases substantially inert with respect to the polymerization may be used. More specifically, use may be made of one or two or more gases selected from the group consisting of steam, air, nitrogen, argon, helium, neon and like gases. Industrially suitable are a mixture of air and/or nitrogen with steam or steam alone. The relative humidity of gas phase is at least 30%, preferably at least 60%. A relative humidity less than 30% is not preferred, since (when the supplied monomer droplets have a diameter of less than $10\mu\phi$) water is evaporated from the monomer droplets prior to the initiation of its polymerization to precipitate solid matter which remains as unreacted monomer matter or, in some cases, the polymerization is not initiated at all. Although air may inhibit polymerization in some cases, it is herein understood that air may be taken as being a gas substantially inert with respect to the polymerization.

In consideration of the amount of heat carried by the aqueous feed monomer solution and the heat of polymerization, the vapor phase should be set at a temperature sufficient to immediately initiate and continue the polymerization. In terms of the polymerization temperature after the initiation of polymerization, a temperature of generally 10° to 300° C., preferably 20° to 250°

C., more preferably 20° to 110° C. is applied, although the polymerization temperature correlates with how to effect the initiation of polymerization and the rate of polymerization. At a temperature lower than 10° C., any industrial process is not economically achievable, since the rate of polymerization slows down with an increase in the space distance involved. At a temperature exceeding 300° C., on the other hand, the resulting polymers increase in the density of crosslinking because of their aptness to self-crosslinking, leading to decrease in the water absorption capacity.

When using steam alone, the temperature of the vapor phase is generally in a range of 20° to 300° C., preferably 105° to 230° C. At a temperature below 20° C., any industrial process is not economically achievable, since the rate of polymerization slows down with an increase in the residence time involved. At a temperature exceeding 300° C., on the other hand, the resulting polymers again increase in the density of crosslinking with a decrease in the water absorption capacity because of their aptness to self-crosslinking. It is understood that the process of the present invention is feasible even at a temperature as high as 200° C. or above, at which usual liquid-phase polymerization encounters difficulty, probably because the temperature of the resultant polymers is not appreciably increased due to a reduced polymerization time.

Since no particular limitation is imposed upon the pressure of the vapor phase, the process of the present invention may be carried out under reduced pressure, normal pressure or pressure.

No particular limitation is placed upon the direction of a stream of a gas or gases forming the vapor phase with respect to the flowing direction of the water soluble ethylenically unsaturated monomer solution fed. In other words, the gas may flow countercurrently or concurrently, or may be kept stationary. However, it is preferred that the gas or gases flows or flow counter-gravitationally, since the length of the residence time of the water soluble ethylenically unsaturated monomer solution can then be increased. It is also preferred that the stream of the gas has a velocity distribution within the reactor. It is possible to flow the gas in the vicinity of the wall surface at a high velocity or supply the gas from the wall surface. The flow velocity of the gas may be 20 m/sec. or below, preferably 5 m/sec. or below, as expressed in terms of average flow velocity. A velocity exceeding 20 m/sec. is economically undesirable, since there is then a need of supplying the gas in a large amount, which leads to another need of providing a blower of large size, etc.

Predetermined for the residence time of the feed monomer in the gas stream is a certain range in which satisfactory results are obtained, which varies depending upon the temperature of the gas stream, the partial pressure of steam in the gas stream, the temperature of the feed monomer and other factors. However, such a residence time is in a range of preferably 0.01 to 120 seconds, more preferably 0.1 to 60 seconds. If the residence time is below 0.01 second, the resulting polymers will then fail to retain shape upon water absorption due to low conversion of the monomers into the polymer and insufficient crosslinking. A residence time exceeding 120 seconds is, on the other hand, uneconomical due to an increase in the size of the polymerization vessel to be used.

Preferably, the polymerization carried out under the foregoing vapor-phase conditions, for the most part, proceeds in the vapor phase. It is noted that this polymerization may be easily carried out in any one of batchwise, semi-batchwise or continuous modes of operation by controlling the residence time of the feed monomer solution after fed to the polymerization vessel with the gas flow velocity. Of these modes, preference is given to the continuous mode of operation from an industrial standpoint of view. After the polymerization, the polymer products may be collected and recovered by suitable means such as stationary settling, cyclones and filters, which may be selected depending upon their particle size.

In order to prevent the formation of polymer deposits on the reactor's wall surface or easily remove such polymer deposits, it is desired that the temperature of the reactor's wall surface be at least 10° C., preferably at least 30° C. higher than the temperature of the vapor phase in the reactor. When the temperature difference is less than 10° C., difficulty is experienced in the continuous operation of the reactor over an extended period of time due to an increase in the amount of the polymer deposits built-up. Moreover, it is desired that the temperature of the reactor's inner wall surface per se at least 20° C. (preferably up to 300° C.), preferably at least 90° C., more preferably at least 130° C.

If the aforesaid conditions are applied to the temperature of the wall surface, it is then possible to prevent the formation of polymer deposits or easily remove such polymer deposits. In order to enhance such an effect, the wall surface, if formed of a metal, may be processed to impart more increased smoothness thereto or coated with resin.

For easy removal of polymer deposits from the inner wall surface of the reactor during its operation, some impacts may be applied thereto by means of, e.g., an air knocker. Alternatively, a gas stream may be applied to the reactor's wall surface by means of an air sweeper. More satisfactory results are obtained by using such means in combination with the above mentioned conditions according to the present invention.

Depending upon the intended purposes, water absorptive resins comprising the thus obtained polymers may subsequently be subjected to drying and other steps, if required. For such steps, known procedures may be applied as such with no need of any special operation and equipment. For instance, dryers to be used may include a hot air dryer, an infrared dryer, a fluidized bed type of dryer and so on. Normally, a drying temperature of about 70° to 200° C. may be applied. The thus dryed water absorptive resins may be classified into the desired particle size with suitable classifiers such as vibration and air types of classifiers.

If required, the water absorptive resins obtained as mentioned above may be post-modified. By way of example, the water absorptive resins may be surface-modified by permitting the carboxylates contained therein to react with known crosslinking agents such as water soluble diglycidyl ether, haloepoxy, aldehyde and cyanol compounds. Such modified products may well be used as water absorptive resins for the same purposes as already mentioned.

Experimental Examples

In what follows, the present invention will be explained specifically but not exclusively with reference to the following examples and comparative examples.

Preparation of monomer (I)

Placed in a stirring bath formed of SUS 304 and provided with a stirrer and a jacket was 37.5 parts by weight of an 80% by weight aqueous solution of acrylic acid, to which 49.3 parts by weight of a 25.4% by weight aqueous solution of caustic soda was added dropwise with the application of external cooling to neutralize to 75 mol % of the acrylic acid. Thereafter, 0.021 part by weight of N,N'-methylene-bisacrylamide was dissolved in the resulting solution to obtain as a feed monomer (I) an aqueous solution of a partially neutralized sodium salt of acrylic acid having a monomer concentration of 42.5% by weight.

Preparation of monomer (II)

Placed in a stirring bath formed of SUS 304 and provided with a stirrer and a jacket was 100 parts by weight of a 79.1% by weight aqueous solution of acrylic acid, to which 36.6 parts by weight of a 48% by weight aqueous solution of caustic soda was added dropwise with the application of external cooling to neutralize 40 mol % of the acrylic acid. Thereafter, 0.03 part by weight of N,N'-methylene-bisacrylamide was dissolved in the resulting solution to obtain as a feed monomer (II) an aqueous solution of a partially neutralized sodium salt of acrylic acid having a monomer concentration of 65% by weight.

Preparation of monomer (III)

Placed in a stirring bath formed of SUS 304 and provided with a stirrer and a jacket were 90.1 parts by weight of a 79.1% by weight aqueous solution of acrylic acid, to which 40.9 parts by weight of a 96% by weight aqueous solution of caustic potash were added dropwise with the application of external cooling to neutralize 75 mol % of the acrylic acid. Thereafter, 0.024 parts by weight of N,N'-methylene-bisacrylamide were dissolved in the resulting solution to obtain as a feed monomer (III) an aqueous solution of a partially neutralized potassium salt of acrylic acid having a monomer concentration of 74.7% by weight.

EXAMPLE 1

As an initiator, 0.75 part by weight of L-ascorbic acid was mixed with and dissolved in 100 parts by weight of the feed monomer (I) to prepare a solution A. Then, as an initiator, 2.5 parts by weight of an aqueous solution of hydrogen peroxide having a concentration of 31% by weight was mixed and homogenized with 100 parts by weight of the same feed monomer (I) to prepare a solution B. The solutions A and B were supplied to the polymerization vessel (300cm$\phi$×900cm) of FIG. 1 to carry out polymerization. The polymerization was effected under the following vapor phase flow conditions: vapor phase: nitrogen and steam, vapor phase temperature at the inlet of the polymerization vessel: 40° C., relative humidity of the vapor phase: 70%, and average gas flow velocity through the polymerization site: 0.9 m/sec. The feed solutions A and B were supplied to the polymerization vessel at a feed pressure of 2 kg/cm$^2$ and a feed rate of 0.1 liter/min., with the feed line being at its extreme end with a feed nozzle (Lumina PR-8, manufactured by Ikeuchi K.K.). About one second after supply of the monomer, the polymerization was initiated in the vapor phase stream to which the monomer was already supplied in droplet forms. About 20 seconds initiation, a polymer product was discharged from the polymerization vessel. The supply of the feed monomer and the solid/gas separation of the obtained polymer were continuously carried out. The polymer was found to show a pure water absorption capacity 860 times as much as its own weight, as measured after drying, have an average particle size of 130 μm and be pseudo-spherical in particulate form.

EXAMPLE 2

Polymerization was carried out in the same manner as in Example 1, except that the vapor phase temperature at the inlet of the polymerization vessel and the average gas stream velocity through the polymerization site were changed to 60° C. and 1.9 m/sec. for the vapor phase flow conditions in the polymerization vessel, and the feed pressure and rate were changed to 2 kg/cm$^2$ and 0.2 liter/min. for the feed conditions of the feed solutions A and B. The polymer was found to show pure water absorption capacity 800 times as much as its own weight, as measured after drying, have an average particle size of 290 μm and be pseudo-spherical in particulate form.

EXAMPLE 3

As an initiator, 0.55 part by weight of L-ascorbic acid was mixed with and dissolved in 100 parts by weight of the feed monomer (II) to prepare a solution C. Then, as an initiator, 1.9 parts by weight of an aqueous solution of hydrogen peroxide having a concentration of 31% by weight were mixed and homogenized with 100 parts by weight of the same feed monomer (II) to prepare a solution D. The solutions C and D were supplied to the polymerization vessel illustrated in FIG. 1 to carry out polymerization. The polymerization was effected in the same manner as in Example 1. About three seconds after supply of the solutions C and D, the polymerization was initiated in the vapor phase stream to which the monomer was already supplied in droplet forms. About five seconds after initiation, the polymerization was completed. The supply of the feed monomer and the solid/gas separation of the obtained polymer were continuously carried out. The polymer was found to show a pure water absorption capacity 760 times as much as its own weight, as measured after drying, have an average particle size of 150 μm and be pseudo-spherical in particulate form.

EXAMPLE 4

Polymerization was carried out in the same manner as in Example 3, except that the vapor phase temperature at the inlet of the polymerization vessel and the average gas stream velocity through the polymerization site were changed to 60° C. and 1.3 m/sec. for the vapor phase flow conditions in the polymerization vessel and the feed rate was changed to 0.2 liter/min. for the feed conditions of the feed solutions C and D. The polymer was found to show a pure water absorption capacity 720 times as much as its own weight, as measured after drying, have an average particle size of 210 μm and be pseudo-spherical in particulate form.

EXAMPLE 5

Polymerization was carried out in the same manner as in Example 1, except that the nitrogen atmosphere was changed to an air atmosphere for the vapor phase flow conditions in the polymerization vessel. The polymer was found to show a pure water absorption capacity 740 times as much as its own weight, as measured after

EXAMPLE 6

As an initiator, 0.75 part by weight of L-ascorbic acid was mixed with and dissolved in 100 parts by weight of the feed monomer (III) to prepare a solution E. Then, as an initiator, 2.5 parts by weight of an aqueous solution of hydrogen peroxide having a concentration of 31% by weight were mixed and homogenized with 100 parts by weight of the same feed monomer (III) to prepare a solution F. The solutions E and F were supplied to the polymerization vessel illustrated in FIG. 1 to carry out polymerization. The polymerization was effected in the same manner as in Example 1. About one second after supply of the solutions E and F, the polymerization was initiated in the vapor phase stream to which the monomer was already supplied in droplet forms. About 10 seconds after initiation, the polymerization was completed. The supply of the feed monomer and the solid/gas separation of the obtained polymer were continuously carried out. The polymer was found to show a pure water absorption capacity 680 times as much as its own weight, as measured after drying, have an average particle size of 140 μm and be pseudo-spherical in particulate form.

EXAMPLE 7

Polymerization was carried out in the same manner as in Example 6, except that the vapor phase temperature at the inlet of the polymerization vessel and the average gas stream velocity through the polymerization site were changed to 60° C. and 1.3 m/sec. for the vapor phase flow conditions in the polymerization vessel. The polymer was found to show a pure water absorption capacity 620 times as much as its own weight, as measured after drying, have an average particle size of 140 μm and be pseudospherical in particulate form.

EXAMPLE 8

For polymerization, the feed monomer (II) was supplied to the polymerization vessel of FIG. 2 under the same conditions as in Example 1, except that the vapor phase temperature at the inlet of the polymerization vessel was changed to 70° C., the feed rate was changed to 0.2 liter/min., and the feed nozzle was changed to 1/4MJ020S316W (manufactured by Ikeuchi K.K.). Polymerization was initiated at a dose of 20 megarads with an electron beam irradiator provided with a Dynamitron accelerator. The gas-stream flow conditions in the polymerization vessel were the same as in Example 1, except that the vapor phase temperature at the inlet of the polymerization vessel was set at 70° C. After the feed monomer was supplied to the polymerization vessel, the polymerization was initiated in the vapor phase stream to which the monomer was already supplied in droplets form immediately after irradiation of electron beam. About 5 seconds after initiation, the polymer was discharged from the polymerization vessel. The supply of the feed monomer and the solid/gas separation of the obtained polymer were continuously carried out. The polymer was found to show a pure water absorption capacity 640 times as much as its own weight, as measured after drying, have an average particle size of 160 μm and be pseudo-spherical in particulate form.

EXAMPLE 9

The feed monomer (III) was supplied to the polymerization vessel of FIG. 2 under the same feed conditions as in Example 8 to carry out polymerization. Polymerization was initiated at a dose of 20 megarads with an electron beam irradiator provided with a Dynamitron accelerator. The gas-stream flow conditions in the polymerization vessel were the same as in Example 6, except that the vapor phase temperature at the inlet of the polymerization vessel was set at 70° C. After the feed monomer was supplied to the polymerization vessel, the polymerization was initiated in the vapor phase stream to which the monomer was already supplied in droplets form immediately after irradiation of electron beam. About 5 seconds after initiation, the polymer was completed. The supply of the feed monomer and the solid/gas separation of the obtained polymer were continuously carried out. The polymer was found to show a pure water absorption capacity 620 times as much as its own weight, as measured after drying, have an average particle size of 130 μm and be pseudo-spherical in particulate form.

EXAMPLE 10

As a photosensitizer, 0.05 part by weight of 2,2-azobis(N,N'-dimethyleneisobutylamidine) dihydrochloride was mixed with and dissolved in 100 parts by weight of the feed monomer (I), and the solution was supplied to the polymerization vessel of FIG. 2 under the same feed conditions as in Example 8, except that the inlet temperature of the polymerization vessel was 50° C. and the relative humidity was 80%. Polymerization was initiated with the irradiation at 120 W/cm of ultraviolet rays from four opposite sets of eight high-pressure mercury lamps, each at 4 KW. The gas-stream flow conditions in the polymerization vessel were the same as in Example 1, except that the vapor phase temperature at the inlet of the polymerization vessel was set at 50° C. After the feed monomer was supplied to the polymerization vessel, polymerization was initiated, immediately upon exposure to ultraviolet rays, in the vapor-phase stream to which the monomer was already supplied in droplet forms. About 20 seconds after the initiation, the polymerization was completed. The supply of the feed monomer and the solid/gas separation of the obtained polymer were continuously carried out. The polymer was found to show a pure water absorption capacity 800 times as much as its own weight, as measured after drying, have an average particle size of 150 μm and be pseudo-spherical in particulate form.

EXAMPLE 11

As a photosensitizer, 0.07 part by weight of 2,4-dihydroxybenzophenone was mixed with 100 parts by weight of the feed monomer (II), and the mixture was supplied to the polymerization vessel of FIG. 2 under the same feed conditions as in Example 8. Polymerization was initiated with irradiations in series of ultraviolet rays at 80 W/cm from two opposite sets of four high-pressure mercury lamps, each at 4 KW, and electron beams from an electron beam irradiator (operating at a dose of 10 megarads) equipped with a Dynamitron accelerator. The gas-stream flow conditions in the polymerization vessel were the same as in Example 8, except that the vapor phase temperature at the inlet of the polymerization vessel was set at 50° C. After the feed monomer was supplied to the polymerization vessel, polymerization was immediately initiated in the vapor-phase stream to which the monomer was already supplied in droplet forms with the irradiations of ultraviolet rays and electron beams. About eight seconds after initiation, the polymerization was completed. The supply of the feed monomer and the solid/gas separation of the obtained polymer were continuously carried out. The polymer was found to show a pure water absorption capacity 620 times as much as its own weight, as measured after drying, have an average particle size of 150 μm and be pseudo-spherical in particulate form.

EXAMPLE 12

As a photosensitizer, 0.04 part by weight of 2,2-azobis(N,N'-dimethyleneisobutylamidine) dihydrochloride was mixed with and dissolved in 100 parts by weight of the feed monomer (III), and the solution was supplied to the polymerization vessel of FIG. 2. Polymerization was initiated with the irradiation of ultraviolet rays at 120 W/cm from four opposite sets of eight high-pressure mercury lamps, each at 4 KW. The gas-stream flow conditions in the polymerization vessel were the same as in Example 6, except that the vapor phase temperature at the inlet of the polymerization vessel was set at 50° C. The feed conditions were the same as in Example 8. After the feed monomer was supplied to the polymerization vessel, polymerization was initiated, immediately upon exposure to ultraviolet rays, in the vapor-phase stream to which the monomer was already supplied in droplet forms. About 15 seconds after the initiation, the polymerization was completed. The supply of the feed monomer and the solid/gas separation of the obtained polymer were continuously carried out. The polymer was found to show a pure water absorption capacity 690 times as much as its own weight, as measured after drying, have an average particle size of 150 μm and be pseudospherical in particulate form.

COMPARATIVE EXAMPLE 1

Feed solutions (G and H) polymerization having a monomer concentration of 19.3% by weight were prepared by mixing 120 parts by weight of pure water with the solutions A and B of Example 1 in the respective amounts of 100 parts by weight. Polymerization was carried out with the solutions G and H under otherwise the same conditions as in Example 1. The obtained polymer was found to fail to retain any shape in a hydrous state.

COMPARATIVE EXAMPLE 2

A feed solution (I) having a monomer concentration of 18% by weight was prepared by adding 358 parts by weight of pure water to 100 parts by weight of the feed monomer (II). Polymerization was carried out with the solution I under otherwise the same conditions as in Example 8. The obtained polymer was found to fail to retain any shape in a hydrous state.

EXAMPLE 13

The solutions A and B of Example 1 were supplied to the polymerization vessel of FIG. 1 to carry out polymerization. The vapor-phase stream conditions were: vapor phase: super-heated steam, vapor phase temperature at the inlet of the polymerization vessel: 150° C., relative humidity of the vapor phase: 90%, and average gas (steam) flow velocity through the polymerization site: 0.9 m/sec. The feed conditions of the feed solutions A and B were the same as in Example 1. About one second after supply of the solution polymerization was initiated in the vapor phase stream to which the monomer solutions were already supplied in droplet forms. About five seconds after initiation, the polymerization was completed. The supply of the feed monomer and the solid/gas separation of the obtained polymer were continuously carried out. The polymer was found to show a pure water absorption capacity 770 times as much as its own weight, as measured after drying, have an average particle size of 130 μm and be pseudo-spherical in particulate form.

EXAMPLE 14

Polymerization was carried out in the same manner as in Example 13 except that the average gas flow velocity through the polymerization site was changed to 1.3 m/sec. The polymer was found to show a pure water absorption capacity 740 times as much as its own weight, as measured after drying, have an average particle size of 190 μm and be pseudo-spherical in particulate form.

EXAMPLE 15

Polymerization was carried out in the same manner as in Example 13 with the use of the solutions C and D of Example 3. About one second after supply of the solutions C and D, the polymerization was initiated in the vapor phase stream to which the monomer was already supplied in droplet forms. About four seconds after initiation, the polymerization was completed. The supply of the feed monomer and the solid/gas separation of the obtained polymer were continuously carried out. The polymer was found to show a pure water absorption capacity 690 times as much as its own weight, as measured be pseudo-spherical in particulate form.

EXAMPLE 16

Polymerization was carried out in the same manner as in Example 15 except that the average gas flow velocity through the polymerization site was changed to 1.3 m/sec. The polymer was found to show a pure water absorption capacity 650 times as much as its own weight, as measured after drying, have an average particle size of 210 μm and be pseudo-spherical in particulate form.

EXAMPLE 17

Polymerization was carried out in the same manner as in Example 6 except that the vapor-phase stream conditions were changed as follows: vapor phase: super-heated steam, vapor phase temperature at the inlet of the polymerization vessel: 150° C., relative humidity of the vapor phase: 90%, and average gas (steam) flow velocity through the polymerization site: 0.8 m/sec. The polymer was found to show a pure water absorption capacity 700 times as much as its own weight, as measured after drying, have an average particle size of 130 μm and be pseudo-spherical in particulate form.

EXAMPLE 18

The feed monomer was supplied to the polymerization vessel of FIG. 2 under the same feed conditions as in Example 8 to carry out polymerization. Polymerization was initiated at a dose of 20 megarads with an electron beam irradiator provided with a Dynamitron accelerator. The gas-stream flow conditions in the polymerization vessel were the same as in Example 8, except that the vapor phase temperature at the inlet of the polymerization vessel was set at 160° C. and the relative humidity of the vapor phase was changed to 70%. After the feed monomer was supplied to the polymerization vessel, the polymerization was initiated in the vapor phase stream to which the monomer was already supplied in droplet forms immediately after irradiation of electron beams. About 4 seconds after initiation, the polymer was completed. The supply of the feed monomer and the solid/gas separation of the obtained polymer were continuously carried out. The polymer was found to show a pure water absorption capacity 580 times as much as its own weight, as measured after drying, have an average particle size of 170 µm and be pseudo-spherical in particulate form.

EXAMPLE 19

The feed monomer solution prepared in Example 10 was supplied to the polymerization vessel of FIG. 2 under the same feed conditions as in Example 10, except that the inlet temperature of the polymerization vessel was 160° C. and the relative humidity of the gas phase was changed to 85%. Polymerization was initiated with the irradiation at 120 W/cm of ultraviolet rays from four opposite sets of eight high-pressure mercury lamps, each at 4 KW. After the feed monomer was supplied to the polymerization vessel, polymerization was initiated, immediately upon exposure to ultraviolet rays, in the vapor-phase stream to which the monomer was already supplied in droplet forms. About 8 seconds after initiation, the polymerization was completed. The supply of the feed monomer and the solid/gas separation of the obtained polymer were continuously carried out. The polymer was found to show a pure water absorption capacity 760 times as much as its own weight, as measured after drying, have an average particle size of 150 µm and be pseudospherical in particulate form.

COMPARATIVE EXAMPLE 3

Polymerization was carried out in the same manner as in Example 1 except that the vapor phase was changed to that of super-heated dry air at 130° C. About 2 seconds after supply of the solutions A and B the polymerization was initiated in the vapor phase stream to which the monomer was already supplied in droplet forms. About 3 seconds after initiation, the polymerization stopped. The polymer was found to be water solible, have an average particle size of 130 µm and be pseudo-spherical in particulate form. Unreacted acrylic acid and sodium acrylate were detected in the polymer in an amount of 70% by weight.

EXAMPLE 20

As an initiator, 0.55 part by weight of L-ascorbic acid was mixed with and dissolved in 100 parts by weight of the feed monomer (I) to prepare a solution J. Then, as an initiator, 1.9 parts by weight of an aqueous solution of hydrogen peroxide having a concentration of 31% by weight were mixed and homogenized with 100 parts by weight of the same feed monomer (I) to prepare a solution K. The solutions J and K were supplied to the polymerization vessel of FIG. 1 to carry out polymerization. The vapor-phase stream conditions were as follows: vapor phase: heated steam, vapor phase temperature at the inlet of the polymerization vessel: 180° C., relative humidity of vapor phase: 80° C., and average gas flow velocity through the polymerization site: 0.9 m/sec. The feed conditions of the mixed solutions J and K were the same as in Example 1. The temperature of the inner wall surface of the polymerization vessel was set at 230° C. (50° C. higher than the temperature of the vapor phase in the polymerization system) by passing steam through the jacket. About one second after supply of the solutions J and K, polymerization was initiated in the vapor phase stream to which the monomer was already supplied in droplet forms. About five seconds after initiation, the polymer was discharged from the polymerization vessel. The supply of the feed monomer and the solid/gas separation of the obtaining polymer were continuously carried out. The polymer was found to show a pure water absorption capacity 690 times as much as its own weight, as measured after drying, have an average particle size of 150 µm and be pseudo-spherical in particulate form. Table 1 shows the amount of the polymer deposited on the inner wall surface of the polymerization vessel after its 24-hour continuous operation.

EXAMPLES 21 TO 25

Polymerization was carried out at varied temperatures of the inner wall surface of the polymerization vessel under otherwise the same conditions as in Example 20. Table 1 shows the amounts of the polymer deposited on the inner wall surface of the polymerization vessel after its 24-hour continuous operation.

EXAMPLE 26

The feed monomer (II) was supplied to the polymerization vessel of FIG. 2 under the same conditions as in Example 8. Polymerization was initiated at a dose of 20 megarads with electron beams from an electron beam irradiator provided with a Dynamitron accelerator. The gas-stream flow conditions in the polymerization vessel were the same as in Example 13, except that the vapor phase temperature at the inlet of the polymerization vessel was changed to 110° C., the relative humidity in the vapor phase was changed to 95%, and the temperature of the inner wall surface of the polymerization vessel was set at 210° C. After the feed monomer was supplied, polymerization was initiated, immediately upon exposure to electron beams, in the vapor phase stream to which the monomer was already supplied in droplet forms. About four seconds after the initiation, the polymer produced was discharged from the polymerization vessel. The supply of the feed monomer and the solid/gas separation of the obtained polymer were continuously conducted. The polymer was found to show a pure water absorption capacity 600 times as much as its own weight, have an average particle size of 160 µm and be pseudo-spherical in particulate form. Table 2 shows the amount of the polymer deposited on the inner wall surface of the polymerization vessel after its 24-hour continuous operation.

EXAMPLES 27 TO 31

Polymerization was carried out at varied temperatures of the inner wall surface of the polymerization vessel under otherwise the same conditions as in Example 26. Table 2 shows the amounts of the polymer deposited on the inner wall surface of the polymerization vessel after its 24-hour continuous operation.

EXAMPLE 32

As a photosensitizer, 0.07 part by weight of 2,4-dihydroxybenzophenone was mixed with and dissolved in 100 parts by weight of the feed monomer (II), and the solution was supplied to the polymerization vessel of FIG. 2 at an inlet temperature of the polymerization vessel of 50° C. under otherwise the same feed conditions as in Example 8. Polymerization was initiated with the irradiation at 120 W/cm of ultraviolet rays from four opposite sets of eight high-pressure mercury lamps, each at 4 KW. The gas-stream flow conditions in the polymerization vessel were the same as in Example 8, except that the vapor phase temperature at the inlet of the polymerization vessel was changed to 110° C. and the relative humidity in the vapor phase was changed to 95%. After the feed monomer was supplied to the polymerization vessel, polymerization was initiated, immediately upon exposure to ultraviolet rays, in the vapor-phase stream to which the monomer was already supplied in droplet forms. About eight seconds after the initiation, polymerization was completed. The supply of the feed monomer and the solid/gas separation of the obtained polymer were continuously carried out. The polymer was found to show a pure water absorption capacity 760 times as much as its own weight, as measured after drying, have an average particle size of 150 μm and be pseudospherical in particulate form. Table 3 shows the amount of the polymer deposited on the inner wall surface of the polymerization vessel after its 24-hour continuous operation.

EXAMPLES 33 TO 37

Polymerization was carried out at varied temperatures of the inner wall surface of the polymerization vessel under otherwise the same conditions as in Example 32. Table 3 shows the amounts of the polymer deposited on the inner wall surface of the polymerization vessel after its 24-hour continuous operation.

TABLE 1

| Example No. | 20 | 21 | 22 | 23 | 24 | 25 |
|---|---|---|---|---|---|---|
| Surface Temperature of Inner Wall (°C.) | 180 | 210 | 200 | 250 | 90 | 100 |
| Amount of Deposits (kg) | <1 | 2 | 5 | <1 | 33 | 21 |

TABLE 2

| Example No. | 26 | 27 | 28 | 29 | 30 | 31 |
|---|---|---|---|---|---|---|
| Surface Temperature of Inner Wall (°C.) | 210 | 190 | 170 | 230 | 90 | 100 |
| Amount of Deposits (kg) | 2 | 2 | 5 | 1 | 52 | 36 |

TABLE 3

| Example No. | 32 | 33 | 34 | 35 | 36 | 37 |
|---|---|---|---|---|---|---|
| Surface Temperature of Inner Wall (°C.) | 230 | 200 | 170 | 250 | 90 | 100 |
| Amount of Deposits (kg) | 2 | 2 | 6 | 1 | 55 | 40 |

COMPARATIVE EXAMPLE 4

Polymerization was carried out in an atmosphere of overheated dry air (130° C.) under otherwise the same conditions as in Example 1. About two seconds after the supply of the solutions A and B, polymerization was initiated in the vapor-phase stream to which the monomer was already supplied in droplet forms. About three seconds after the initiation, the polymerization was completed. The polymer was a water soluble polymer and found to contain 70% by weight of unreacted acrylic acid and sodium acrylate. That polymer had an average particle size of 130 pm and were pseudo-spherical in particulate form.

What is claimed is:

1. A process for the preparation of water absorptive resins which comprises supplying a solution containing as a main component 45 to 80% by weight of a water soluble monomer selected from the group consisting of a partially neutralized sodium acrylate in which 20 to below 95% of the carboxyl groups are neutralized to its sodium salt and a partially neutralized potassium acrylate in which 40% or more of the carboxyl groups are neutralized to its potassium salt to a polymerization vessel accommodating a vapor phase comprising steam or a mixture of steam with at lest one gas substantially inert with respect to polymerization, and polymerizing the monomer with the use of a redox initiator or with irradiation of ultraviolet rays and/or high-energy radiations in the vapor phase under the relative humidity conditions in said vapor phase of 30% or more.

2. The process according to claim 1, wherein the vapor phase comprises a mixture of air and/or nitrogen and steam.

3. The process according to claim 1, wherein the vapor phase comprises steam or a mixture of air and steam.

4. The process according to claim 1, wherein the polymerization is carried out with irradiation of ultraviolet rays and/or high-energy radiations.

5. The process according to claim 1, wherein the temperature of the inner wall surface of the polymerization vessel is set at a temperature which is at least 10° C. higher than that of the vapor phase.

* * * * *